(12) United States Patent
Kajihara et al.

(10) Patent No.: US 7,583,314 B2
(45) Date of Patent: Sep. 1, 2009

(54) MONITORING CAMERA

(75) Inventors: Hideaki Kajihara, Kawasaki (JP);
Michihiko Tsunekawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 11/260,698

(22) Filed: Oct. 27, 2005

(65) Prior Publication Data
US 2006/0098117 A1     May 11, 2006

(30) Foreign Application Priority Data
Nov. 11, 2004   (JP)  .............................. 2004-327379

(51) Int. Cl.
*H04N 5/225*  (2006.01)
*H04N 7/18*   (2006.01)
*H04N 9/47*   (2006.01)

(52) U.S. Cl. ...................................... 348/373; 348/143

(58) Field of Classification Search ......... 348/373–375, 348/143, 151, 81; 396/419, 535, 541; D16/203; 361/704, 707, 600, 816
See application file for complete search history.

(56) References Cited

U.S. PATENT DOCUMENTS

| | | | | |
|---|---|---|---|---|
| 4,485,407 A | * | 11/1984 | Bohm et al. ................. | 348/374 |
| 4,652,930 A | * | 3/1987  | Crawford ...................  | 348/357 |
| 5,864,365 A | * | 1/1999  | Sramek et al. ..............  | 348/373 |
| 5,999,406 A | * | 12/1999 | McKain et al. .............   | 361/704 |
| 6,320,748 B1 | * | 11/2001 | Roden et al. ................ | 361/704 |
| 6,392,704 B1 | * | 5/2002  | Garcia-Ortiz ...............  | 348/373 |
| 6,628,338 B1 | * | 9/2003  | Elberbaum et al. ..........   | 348/373 |
| 6,894,724 B2 | * | 5/2005  | Patel et al. ...................| 348/373 |
| D509,843 S | * | 9/2005  | Cho .......................... | D16/203 |
| 7,004,648 B2 | | 2/2006 | Ariga | |
| 7,090,415 B2 | * | 8/2006  | Ariga ......................... | 396/419 |
| 7,123,481 B2 | * | 10/2006 | Gotou et al. ................. | 361/704 |
| 7,180,546 B2 | * | 2/2007  | Kobayashi ...................| 348/374 |
| 7,289,563 B2 | * | 10/2007 | Yamamoto et al. ..... | 375/240.12 |
| 7,359,199 B2 | * | 4/2008  | Sengoku et al. ............. | 361/704 |
| 2003/0151691 A1 | * | 8/2003 | Tokano ........................ | 348/375 |
| 2004/0125560 A1 | | 7/2004 | Gotou et al. | |
| 2004/0214482 A1 | * | 10/2004 | Ariga ......................... | 439/894 |

FOREIGN PATENT DOCUMENTS

| | | |
|---|---|---|
| CN | 1542538 A | 11/2004 |
| JP | 05-207340 | 8/1993 |
| JP | 08-102880 | 4/1996 |

* cited by examiner

*Primary Examiner*—Tuan V Ho
*Assistant Examiner*—Marly Camargo
(74) *Attorney, Agent, or Firm*—Cowan, Liebowitz & Latman, P.C.

(57) ABSTRACT

A metal structure (101) having a substantially U-letter shape is provided in a chassis. Tripod screw attaching portions (102*a*) are provided to the upper and lower portions of the metal structure. A casing is arranged to cover the front surface of the front portion and the lower surface of the rear portion of the metal structure (101). A metal chassis panel (105, 106) is attached to cover at least the left and right surfaces of the metal structure. The casing portion of the front surface of the metal structure is substantially curved to enable tally lamp light to be recognized at the casing portion of the front surface.

8 Claims, 5 Drawing Sheets

MONITORING CAMERA

FIELD OF THE INVENTION

The present invention relates to the structure of an image sensing apparatus (monitoring camera) such as a monitoring video camera.

BACKGROUND OF THE INVENTION

In general, a monitoring camera is an apparatus which photographs a predetermined monitoring area by a solid-state element such as a CCD, transmits an obtained image signal to a monitoring center, and displays the image signal on a monitor screen or records and stores it on a hard disk recorder or the like to monitor an intruder. When monitoring, naturally, the image sensing range of the monitoring camera is adjusted to a predetermined monitoring area that needs monitoring, and the monitoring camera is set on the ceiling, wall, floor, or the like to monitor.

Particularly, in recent years, as the significance of security increases, the use of the monitoring camera is becoming popular in offices, stores, parking lots, outdoors, and furthermore houses. In this situation, the monitoring camera can be installed at any location whether indoors or outdoors, as described above, and must have such a shape that it can be installed at any location.

In other words, the monitoring camera requires an attaching portion that copes with installation at any location. Because of the nature of the monitoring camera, when it is installed outdoors, its attaching portion and furthermore the main body itself must have a high strength and durability against an external destructive attack. When the monitoring camera is installed outdoors, heat that is generated upon irradiation with the solar heat and by internal electronic circuit components and increases the temperature must be dissipated efficiently.

For example, according to the first prior art, when hanging a rectangular parallelepiped monitoring camera from the ceiling, the tripod attaching portion for the main body is attached to the upper surface portion of the main body with a screw. When the tripod attaching portion is to be attached to a tripod or the like from below, some monitoring camera can be set in two ways. Namely, the tripod attaching portion can be removed and attached again to the lower surface portion of the main body with a screw so that the monitoring camera can be hung. Alternatively, the tripod can be attached directly from the lower portion (Japanese Patent Laid-Open No. 5-207340). According to another example, the tripod screw portion is shifted in accordance with where and how the tripod is to be attached, as in Japanese Patent Laid-Open No. 8-102880.

According to the second prior art, tripod screw portions are directly formed on the upper and lower surface portions of the casing of the rectangular parallelepiped camera main body (Japanese Patent Laid-Open No. 5-207340). According to the third prior art, the tripod attaching portion is provided to only one portion of the upper or lower surface, and a CCD image is output from either the upper or lower portion in accordance with how the tripod is attached. According to the fourth prior art, the third prior art is modified so that the CCD image is output from a portion which is electrically opposite to where, either the upper or lower portion, the tripod is attached.

Regarding heat dissipation, according to the fifth prior art, the chassis is made by using aluminum die cast, magnesium die cast, or the like to dissipate heat from the casing. This increases the strength of the main body of the casing chassis as well. Furthermore, according to the sixth prior art, a fan is set in the monitoring camera main body.

In the first prior art described above, the tripod attaching portion is fixed to the main body with a screw, and is removed and attached again in accordance with how the camera is to be installed. Therefore, when the strength of the tripod attaching portion is to be increased, the structure of the tripod attaching portion inevitably becomes large, and accordingly the main body itself becomes bulky. As in the second prior art, when the tripod attaching portions are formed on the upper and lower portions of the main body casing, the loads acting on the tripod attaching portions are undesirably, directly transmitted to the casing main body. Thus, a load caused by external destruction is undesirably, directly transmitted to the casing.

In the third prior art, once the monitoring camera is set, it cannot be removed and attached in an opposite direction. For example, once the monitoring camera is attached as a type that hangs from the ceiling, it cannot be removed and attached to a floor stand afterwards. In the fourth prior art, the image must be inverted upside down when how the monitoring camera is attached is changed. The electronic circuits and the like accordingly become complicated to increase the cost.

In the fifth prior art, since die cast of aluminum, magnesium, or the like is used to form the casing, the cost of the casing increases largely. As in the sixth prior art, if a cooling fan is provided in the camera, the main body becomes bulky, and the cost increases. Also, the noise from the fan poses limitation on the location to make it difficult to install the monitoring camera at a quite place.

As described above, according to the prior art, the design is limited due to the structure and strength of the main body of the monitoring camera, and the main body becomes bulky. Also, the number of electronic circuits increases, the cost increases, and the noise is produced.

SUMMARY OF THE INVENTION

The present invention has been made to solve the above inconveniences, and has as its object to provide a monitoring camera which can be downsized, has an attaching portion with high strength, can reduce noise by eliminating a fan to reduce the cost, and is comparatively free from design limitation.

According to the present invention, there is provided a monitoring camera characterized by comprising a metal structure in a chassis, and having screw attaching portions at upper and lower portions of the metal structure, wherein a casing is arranged to cover an upper surface of a front portion and a lower surface of a rear portion of the metal structure, and a metal chassis panel is attached to cover at least left and right surfaces of the metal structure.

The monitoring camera according to the present invention is characterized in that the metal structure has a substantially U-letter shape, and a casing portion of a front surface of the metal structure is substantially curved to enable tally lamp light to be recognized at the casing portion of the front surface.

The monitoring camera according the present invention is characterized by having a circuit board and a metal frame which covers the circuit board, wherein a thermal conductive member such as thermal conductive rubber is adhered to a predetermined portion of the metal structure, and the circuit board and metal frame are joined through a pawl portion or joining member formed on the metal frame.

The monitoring camera according to the present invention is characterized in that when the circuit board and metal frame are joined, the thermal conductive member such as thermal conductive rubber on the metal frame is placed on a heat-generating electronic element of the circuit board to be in tight contact with the heat-generating electronic element.

The monitoring camera according to the present invention is characterized in that when the circuit board and metal frame are joined, an upper portion of the metal frame comes into tight contact with a ground circuit pattern formed on the circuit board and furthermore a casing grounding portion such as a connector on the circuit board.

The monitoring camera according to the present invention is characterized in that a lens unit portion is mounted on the metal structure.

The monitoring camera according to the present invention is characterized in that the metal frame joined with the circuit board is mounted on the metal structure to form a box-like structure.

The monitoring camera according to the present invention is characterized in that heat of an electronic element on the circuit board is transferred to the joined metal frame through the thermal conductive member such as thermal conductive rubber and furthermore to the metal structure connected to the metal frame to conduct heat from the metal structure to the casing attached thereto, so as to dissipate heat outside the chassis.

According to the present invention, typically, tripod screw members are attached to a metal structure (chassis) in the main body. The tripod screw members are covered with a casing member and then covered with a metal chassis panel. Thus, the tripod screw portions have very high strengths and economize the space, thus improving the strength.

Since the tripod screw portions are provided to the two, upper and lower portions, the resultant monitoring camera can be attached in any manner. As a tally lamp (LED) is arranged at the curved portion of the front surface of the casing, the LED can be visually recognized well no matter how the camera is attached.

The chassis of a fan-less, highly efficient heat dissipating structure can be realized without using a die cast casing. When the tripod screw portions on the metal structure are covered with a casing, the casing is made of a plastic material or elastomeric material, and the camera main body is attached to the tripod attaching portions, the casing portion made of the plastic material or elastomeric material serves as an antiskid portion or an anti-loosening portion for the tripod screws.

A monitoring camera structure that can be downsized and cost-reduced can thus be provided.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

Figure 1:
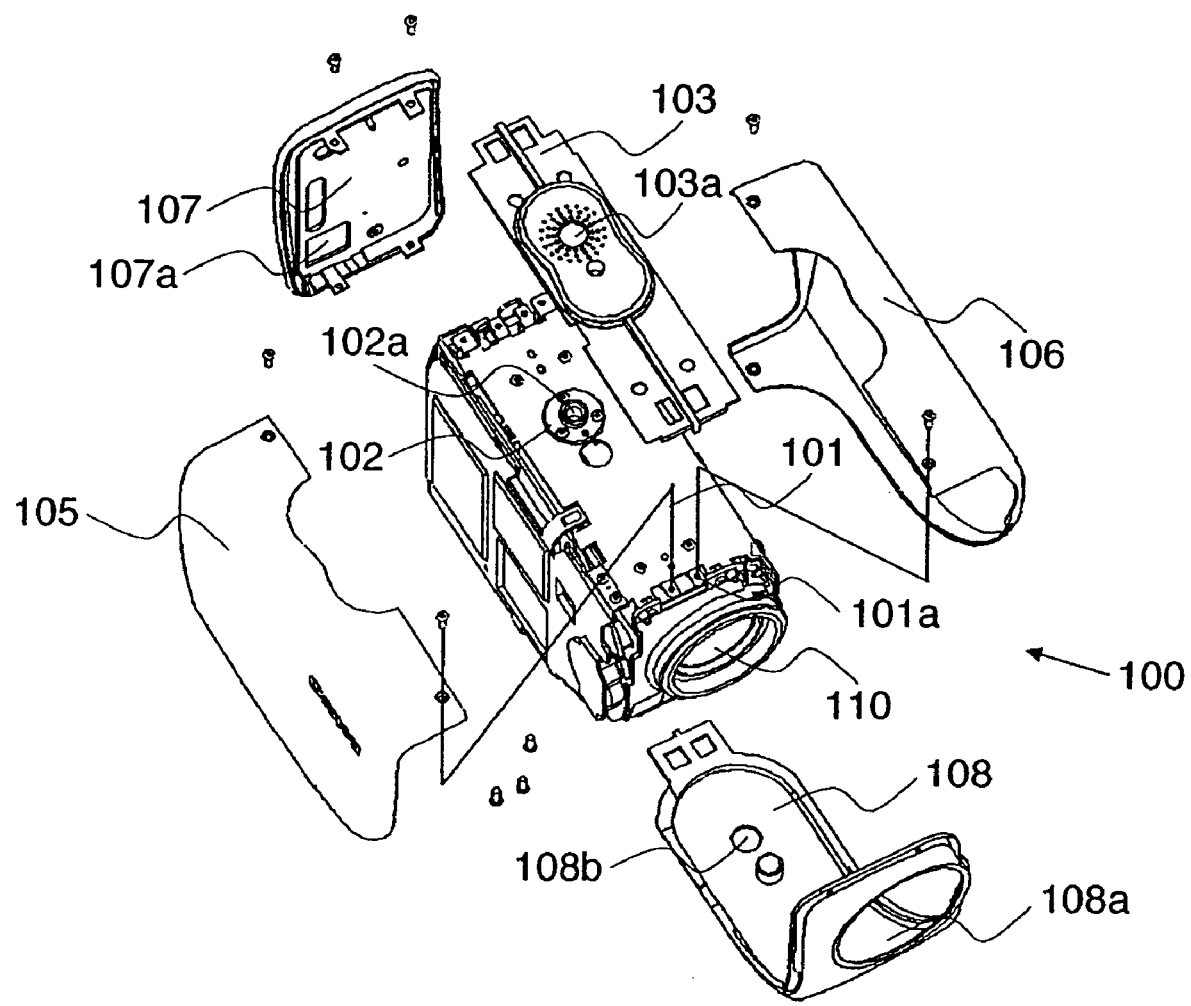
FIG. 1 is a perspective view of the chassis of a monitoring camera to show an example of an embodiment of the present invention.
Figure 2:
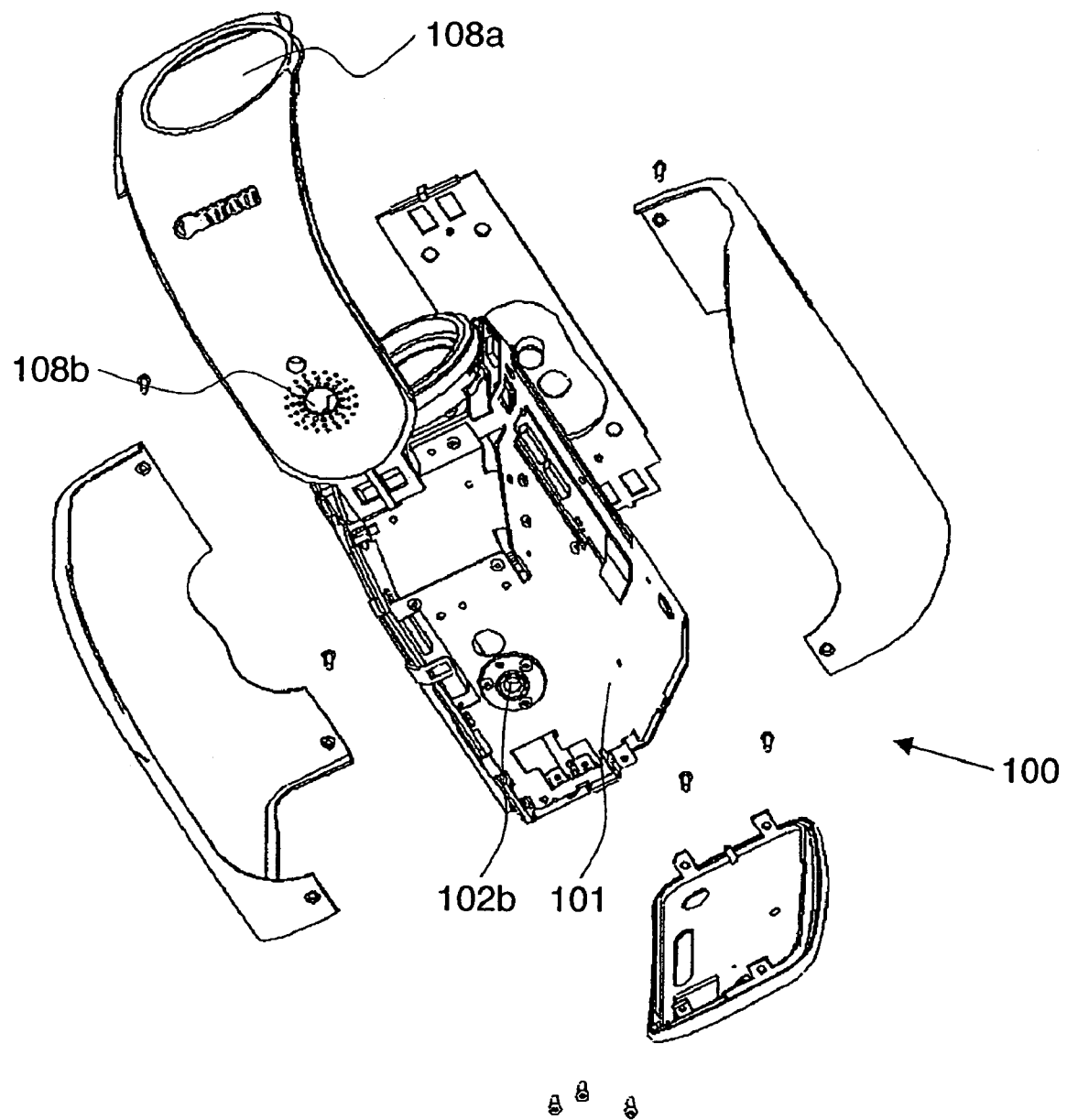
FIG. 2 is a perspective view of the chassis of the monitoring camera to show the example of the embodiment shown in FIG. 1 of the present invention.

The first embodiment of the present invention will be described. FIGS. 1 and 2 are views of a monitoring camera 100 seen from obliquely upper left and obliquely lower right, respectively. A description will be made referring to FIGS. 1 and 2. In FIGS. 1 and 2, reference numeral 101 denotes a chassis made of a metal sheet; 103, 108, and 107, a panel U, panel F, and panel B, respectively, each made of a mold material; and 105 and 106, a panel L and panel R each made of a metal sheet. These components constitute the outer appearance surface of the monitoring camera 100 as a casing.

The chassis 101 has a substantially U-letter shape. Tripod screw members 102a and 102b are attached to the upper and lower portions of the chassis 101. After the tripod screw member 102a is attached, a panel U 103 is attached to the upper portion of the chassis 101. In this case, the screw portion of the tripod screw member 102a is exposed from a hole 103a in the panel U 103. As the tripod screw member 102a is exposed outside, a tripod or the like can be attached to this portion. The material of the panel U 103 contains an elastomer, and the surface of the panel U 103 has been embossed and has a countless number of pores to form circles concentric with the hole 103a. Thus, the panel U 103 has a high coefficient of friction with respect to the tripod attaching surface and accordingly hardly loosens from it.

The panel F 108 is attached to the front surface of the chassis 101. A lens unit 110 (to be described later) enters a hole 108a in the panel F 108 to expose its lens barrel. Part of the tripod screw member 102b enters a hole 108b in the panel F 108 to reinforce the attaching strength of the tripod screw member 102b in the same manner as the hole 103a in the panel U 103 does. Furthermore, the panel B 107 is placed on the rear surface of the chassis 101. The panel B 107 has a hole 107a or the like through which a connector is exposed outside.

After the above components are attached to the chassis 101, the left panel L 105 and the right panel R 106 are attached to the chassis 101 with screw portions 101a or the like of the chassis 101. As the chassis 101 is in tight contact with the panel L 105 and panel R 106 through the screw portions 101a or the like, they are thermally, electrically connected to each other. As the chassis 101, panel L 105, and panel R 106 as metal materials constitute an internal structure, the monitoring camera 100 has excellent rigidity.

Figure 3:
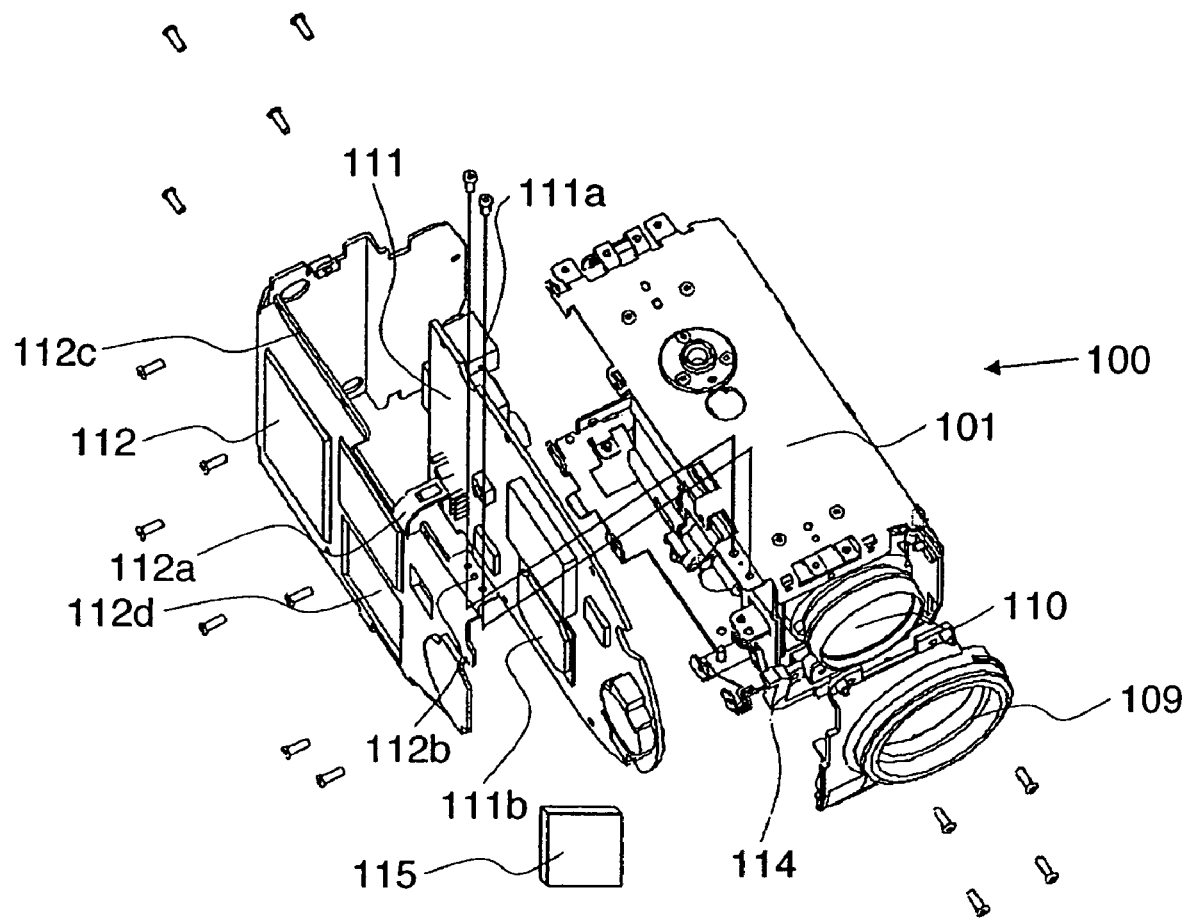
FIG. 3 is a perspective view of the internal structure of the monitoring camera of the embodiment shown in FIG. 1 of the present invention.

The internal structure will be described in detail. FIG. 3 is a perspective view of the monitoring camera 100 from which the outer appearance components are removed to show the internal structure. Referring to FIG. 3, reference numeral 111 denotes a main substrate. Electronic components such as a CPU 111b, an external connector 111a which is to be exposed from the outer appearance surface so as to be connected to the outside, and the like are mounted on the main substrate 111. The main substrate 111 can be attached to a shield plate 112 which has a heat dissipation function, electromagnetic shield function, and heat transfer function. When the main substrate 111 is attached to the shield plate 112, the shield plate 112 largely covers the CPU 111b side of the main substrate 111. The shield plate 112 has a GND portion 112c which is to be electrically connected to the GND pattern (not shown) of the main substrate 111, a heat receiving portion 112d to transfer heat generated by the CPU 111b to the shield plate 112, pawls 112a to temporarily fix the main substrate 111, and a main body attaching portion 112b to be thermally, electrically connected to the chassis 101.

The GND pattern of the main substrate 111 is in contact with the shield plate 112 through the GND portion 112c to set the main substrate 111 and shield plate 112 at the same potential, so that the electromagnetic shield properties of the shield plate 112 from the main substrate 111 improve. As the shield plate 112 is fixed to the chassis 101 by the main body attaching portion 112b, the chassis 101, shield plate 112, and main substrate 111 have the same GND potential.

When the main substrate 111 is attached to the shield plate 112, the heat receiving portion 112d is located above the CPU 111b to be thermally connected to the CPU 111b through heat dissipation rubber 115 attached to the heat receiving portion 112d so as to receive heat from the CPU 111b. The shield plate 112 is made of aluminum having high thermal conductivity. Heat that the shield plate 112 receives from the CPU 111b is conducted to the entire shield plate 112 substantially uniformly to dissipate heat from the entire surface of the shield plate 112 to the atmosphere by radiation and convection. Since the chassis 101 and shield plate 112 are in contact with each other through the main body attaching portion 112b, as described above, they can transfer heat to the chassis 101 as well.

The pawls 112a serve to temporarily fix the main substrate 111 to the shield plate 112. When the main substrate 111 and shield plate 112 are to form a unit, the main substrate 111 is moved toward a predetermined position of the shield plate 112. Projections (not shown) formed on the left and right pawls 112a are deformed so that the main substrate 111 rides over them, and the left and right pawls 112a are opened apart. When the projections (not shown) of the pawls 112a are deformed until the main substrate 111 completely rides over them, the mounting operation is completed with a "click" motion sound. While the main substrate 111 and shield plate 112 form a unit as described above, the shield plate 112 is fixed to the chassis 101 at the main body attaching portion 112b. As a result, the main substrate 111 is placed at a predetermined position of the chassis 101.

Reference numeral 109 denotes a lens frame which covers the lens barrel of the lens unit 110. An LED guide 114 is mounted on the lens frame 109. Part of the LED guide 114 is exposed from the lens frame 109, so that light guided from an LED (not shown) on the main substrate 111 can be seen from the outside. As the cover F 108 described above is made of a transparent material, the tally lamp which is externally guided to the LED through the cover F 108 can be seen. Then, that the monitoring camera 100 is operating can be externally recognized.

Figures 4A, 4B:
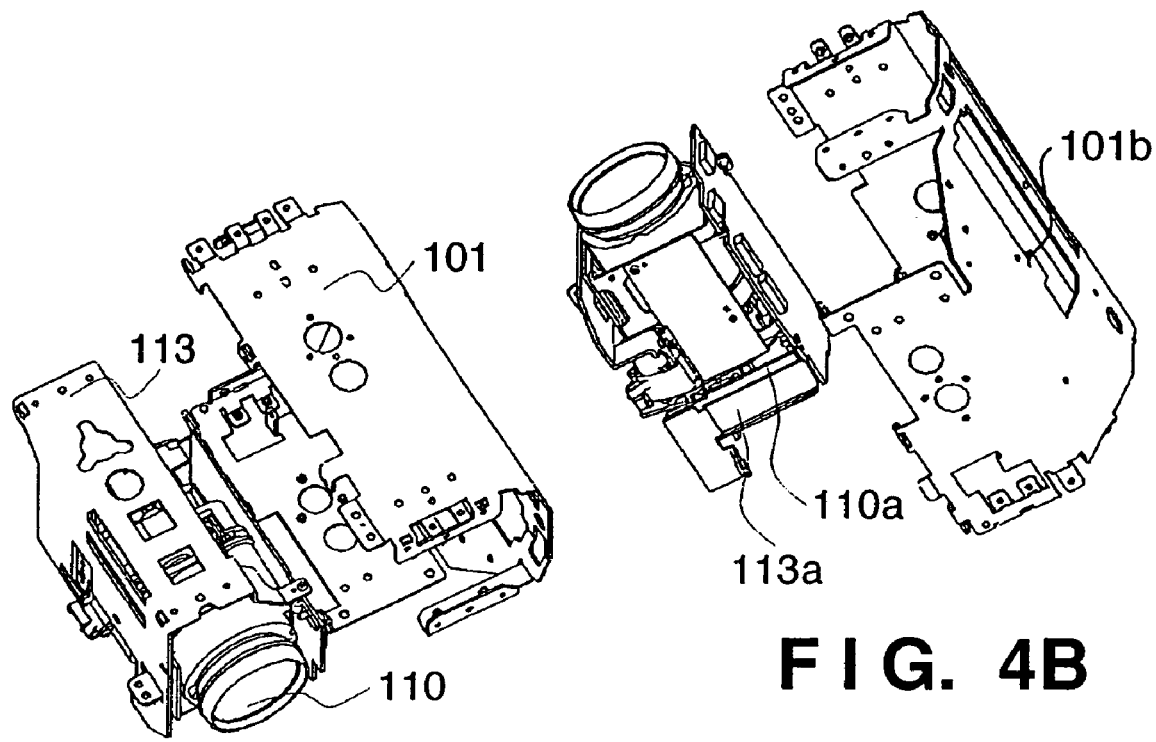
FIGS. 4A and 4B are perspective views of the internal structure of the monitoring camera of the embodiment shown in FIG. 1 of the present invention.

The interior of the chassis 101 will be described with reference to the exploded perspective views of FIGS. 4A and 4B. Referring to FIGS. 4A and 4B, reference numeral 113 denotes a lens frame. The lens unit 110 is to be placed on the upper portion of the lens frame 113. When the lens frame 113 is attached to the chassis 101, the lens unit 110 is placed at a predetermined position of the chassis 101. The lens frame 113 has a heat transfer portion 113a, and is brought into tight contact with a heat dissipating portion 110a of the lens unit 110 through heat dissipation rubber. When the lens unit 110 is attached to the chassis 101, that surface of the lens unit 110 which is opposite to a surface in contact with the heat dissipation rubber at the heat transfer portion 113a is brought into tight contact with a heat receiving portion 101b of the chassis 101, so that the heat transfer portion 113a comes into direct contact with the chassis 101 to dissipate heat to the chassis 101 by heat transfer.

Figures 5A, 5B:
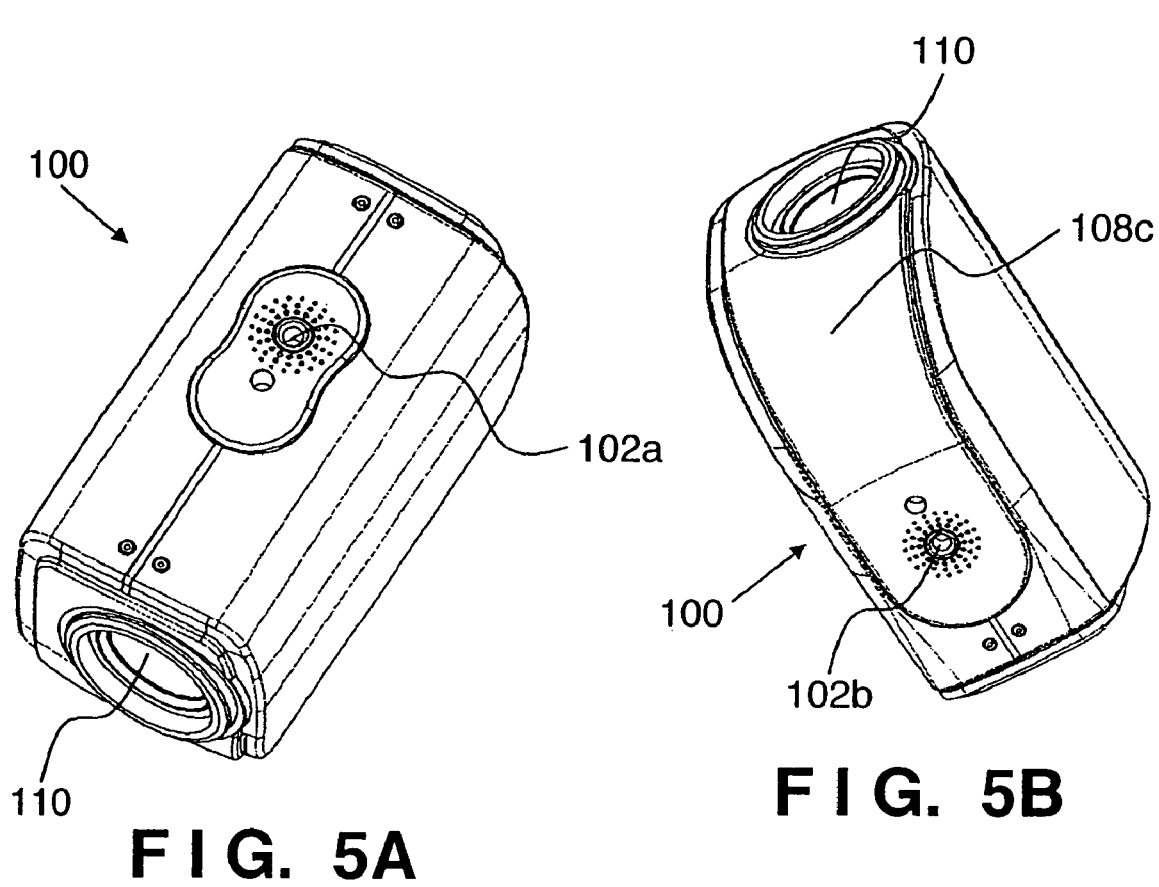
FIGS. 5A and 5B are perspective views of the chassis of the monitoring camera of the embodiment shown in FIG. 1 of the present invention.

Finally, the outer appearance will be described with reference to FIGS. 5A and 5B. FIG. 5A is a view seen from obliquely upper front, and FIG. 5B is a view seen from obliquely lower front. As shown in FIGS. 5A and 5B, the tripod screw members 102a and 102b of the monitoring camera 100 are exposed at the upper and lower portions to enable the monitoring camera 100 to be fixed in various manners, e.g., by hanging from above or fixing by support from below. A curved surface 108c is formed on the lower portion of the front surface of the monitoring camera 100 so that, e.g., when the monitoring camera 100 is placed in a dome, the corner portion of the monitoring camera 100 will not come into contact with the inner wall of the dome. When the curved surface 108c is seen from the front or below, as described above, light guided from the LED guide 114 can be recognized.

The present invention is not limited to the above embodiments and various changes and modifications can be made within the spirit and scope of the present Invention. Therefore, to apprise the public of the scope of the present invention the following claims are made.

CLAIM OF PRIORITY

This application claims priority from Japanese Patent Applications No. 2004-327379 filed on Nov. 11, 2004, the entire contents of which are hereby incorporated by reference herein.

What is claimed is:

1. A monitoring camera comprising:
   a metal structure in a chassis of the camera, wherein the chassis has a substantially square-U shape, and tripod screw members are attached to the upper and lower portions of the chassis;
   a pair of metal chassis panel covering left and right surfaces of the metal structure; and
   a cover having a curved surface from a front part of the metal structure to the bottom part of the metal structure so that a camera body is not contact with the dome member when the camera body is covered by a the dome member,
   wherein said cover is made of a transparent material so that light guided from a light source arranged inside the cover can be recognized.

2. The camera according to claim 1, further comprising a circuit board and a metal frame which covers said circuit board, wherein a thermal conductive member is attached to a predetermined portion of said metal frame, and said circuit board and metal frame are joined through a bracket formed on said metal frame and a screw.

3. The camera according to claim 2, wherein when said circuit board and metal frame are joined, said thermal conductive member on said metal frame is placed on a heat-generating electronic element of said circuit board to be in tight contact with said heat-generating electronic element.

4. The camera according to claim 2, wherein when said circuit board and metal frame are joined, an upper portion of said metal frame is electrically connected with a ground circuit pattern formed on said circuit board and further thermally connected with said metal chassis panel.

5. The camera according to of claim 1, wherein a lens unit is mounted on said metal structure.

6. The camera according to claim 2, wherein said metal frame joined with said circuit board is mounted on said metal structure to form a box-like structure.

7. The camera according to claim 2, wherein heat of an electronic element on said circuit board is transferred to said joined metal frame through said thermal conductive member and furthermore to said metal structure connected to said metal frame to conduct heat from said metal structure to said casing attached thereto, so as to dissipate heat outside said chassis.

8. The camera according to claim 7, wherein said thermal conductive member comprises thermal conductive rubber.

* * * * *